United States Patent
Zauderer et al.

(10) Patent No.: US 6,757,615 B2
(45) Date of Patent: Jun. 29, 2004

(54) METHOD FOR AUTOMATED HORIZON TRANSFER AND ALIGNMENT THROUGH THE APPLICATION OF TIME-SHIFT VOLUMES

(75) Inventors: Kim Zauderer, The Woodlands, TX (US); Brian P. West, Houston, TX (US); John E. Eastwood, Bellaire, TX (US); R. David Potter, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 2 days.

(21) Appl. No.: 10/238,221

(22) Filed: Sep. 10, 2002

(65) Prior Publication Data

US 2003/0055568 A1 Mar. 20, 2003

Related U.S. Application Data

(60) Provisional application No. 60/322,304, filed on Sep. 14, 2001.

(51) Int. Cl.$^7$ .................................................. G01V 1/28
(52) U.S. Cl. .......................................... 702/14; 702/16
(58) Field of Search ............................. 702/14, 16, 17, 702/18; 367/73

(56) References Cited

U.S. PATENT DOCUMENTS 5,132,938 A   7/1992  Walters ...................... 367/38
5,586,082 A * 12/1996  Anderson et al. ............. 367/73

OTHER PUBLICATIONS

Brumbaugh, D. L. (1991) "SMAP (Seismic Mistie Adjustment Procedure) Revisited and Revised" in the 61st Annu SEG Int Mtg (Houston, Nov. 10–14, 1991) Expanded Tech Program Abstr Biogr V1, pp 332–334.

Herkomer, M. A. and Whitney, P. D. (1995) "Minimizing Misties in Seismic Data " in the Batelle Memorial Inst. Computers Geosci. V 20, No. 5, pp. 767–795.

Michael, F. Y. (1995) "Vintage Matching and Misties in Mutisurvey Projects" in the 65th Annual SEG Int Mtg (Houston, Oct. 8–13, 1995) Expanded Tech Program Abstr Biogr. pp 499–500.

Eastwood, J. E. et al. (2002) U.S. patent application No. 10/230,793, "Method for Aligning Multiple Offset Seismic Data Volumes", filed Aug. 29, 2002, 29 pgs.

* cited by examiner

Primary Examiner—Donald E. McElheny, Jr.
(74) Attorney, Agent, or Firm—J. Paul Plummer

(57) ABSTRACT

Seismic horizons are transferred between two three-dimensional seismic data volumes which cover the same area. The seismic data volumes are time-aligned to generate a time-shift volume. A seismic horizon is selected and the time-shift volume is applied to the seismic horizon, generating a time-shifted seismic horizon.

6 Claims, 4 Drawing Sheets

(3 of 4 Drawing Sheet(s) Filed in Color)

METHOD FOR AUTOMATED HORIZON TRANSFER AND ALIGNMENT THROUGH THE APPLICATION OF TIME-SHIFT VOLUMES

This application claims the benefit of U.S. Provisional Application No. 60/322,304 filed on Sep. 14, 2001.

BACKGROUND OF THE INVENTION

1. Field of the Invention

This invention relates generally to the field of seismic data processing. Specifically, the invention is a method for transferring seismic horizon interpretations between three-dimensional volumes.

2. Description of the Related Art

An important trend in the petroleum exploration and production industry is the increased desire to rely on seismic data to guide appraisal and development following discovery. This, in turn, results in the generation of a greater number of versions of the seismic data volumes that result from the acquisition and processing of seismic data. For example, at least one, and often several, seismic surveys are required for exploration and prospect delineation. The data from each of these surveys may be interpreted in several different offset stack seismic volumes, and possibly reprocessed for specification of impedance and phase volumes. For the development and production phases, further seismic data acquisition is often needed, for example to acquire higher frequency data or for seismic time-lapse reservoir monitoring.

A common, virtually unavoidable, consequence of the seismic interpretation process is the shifting of the location of horizons between a reference survey and the different vintages of seismic data volumes that result from reprocessing later seismic surveys, or between 3D and 2D seismic surveys within the same area. The process of horizon transfer and alignment is often tedious, and the various techniques that are presently used, such as applying seismic mis-ties to horizons and horizon shifting and snapping, often result in an unsatisfactory correlation between the shifted horizons and the reference surveys. More specifically, a problem that must be addressed is the vertical time variance of the shift needed to align horizons along each seismic line. That problem can make single shifts inaccurate for multiple horizons or even for single horizons covering large areas.

One approach that has been employed in industry is simply to output the original interpretation and import it into the new volume data set. The original interpretation is then used as a guide and the horizon is re-interpreted in the new data set. This approach is computationally inefficient, and the re-interpretation requirement limits its usefulness.

Another approach that has been employed is to interpret a reconnaissance horizon grid and interpolate the grid to create a surface to use as a reference surface for the original horizon requiring a shift. The mis-ties are then computed, usually using a commercial product, and a static shift mis-tie is determined to apply to the original horizon. Limitations of static shift mis-ties constrains this approach. For example, one is that different seismic volumes have dynamic time mis-ties so that the correction of mis-ties for multiple horizons requires replication of the approach, whereas the horizon alignment approach compensates for dynamic time mis-ties for multiple surfaces between different volumes of seismic data applied from a single determination. Gridding of surfaces also introduces errors inherent to the gridding process, while the horizon alignment approach completely avoids gridding of surfaces.

A third common method to align a previously interpreted horizon to a new version of the original seismic data is to copy the horizon to the new seismic data, estimate the shift for the horizon (typically determined through inspection by the interpreter), estimate a snap window for the shifted horizon, and then snap (a procedure that assigns a value at each trace of the surface to a user-specified seismic property or attribute of the trace, such as maximum and minimum values within a user specified time window) the horizon. The accuracy of the results of this procedure is in part dependent upon the snapping parameter choices that are made by the interpreter. The procedure can be accurate when the new seismic data does not significantly vary from the old version. More commonly, however, newly acquired data, and the processing and reprocessing of the original data, results in non-systematic misalignments between the new and reference data, thereby limiting the usefulness of this procedure.

Frequency (bandwidth) variations between the reference volume and the new volume(s) are also a common cause of horizon misalignment. Frequency differences, and differences in the migration velocities used in generating the volumes, often result in non-systematic misalignment. The complexity of this misalignment increases when other factors are added, such as seismic artifacts, different offset angle stacks, and when AVO analysis is performed, such as for Class 1, Class 2, and Class 3 amplitude anomalies. As will be understood to those skilled in the art, AVO amplitude anomalies are classified in terms of the local increase or decrease in reflection amplitude with varying offset angles, such as is caused by the varying impedances of adjacent geologic layers.

Other techniques have been used in the industry to tackle the problem. For example, the commercial seismic interpretation system Geoframe (IESX), of the GeoQuest division of Schlumberger Corporation, includes a MisTie analysis option. In this option mis-ties are calculated using either of two methods. The first method uses a statistical correlation approach between the seismic data at each intersection. The second method measures the mis-tie between interpreted horizons at each intersection. With either method, only a static shift is applied, and only one value per line intersection is permitted, whether it is from a single correlation or from an average of mis-ties from numerous horizons at that intersection. The user can specify whether a static shift is applied for all intersections, applied for some intersections, or a different shift value is applied to different intersections, and the corrections are applied to user-selected horizons.

There are a number of limitations of this approach. First, it is constrained to computation of constant (single static shift for a line) and/or variable (spatially varying) corrections, but cannot apply a dynamic shift to a seismic trace. The approach is therefore best suited for correcting static mis-ties. Second, the alignment for horizon transfer requires two intersecting surfaces to calculate mis-ties. Third, there is no ability to calculate a dynamic alignment along each seismic trace. Fourth, the alignment cannot be calculated between 3D volumes or between 2D seismic lines. Finally, the alignment technique does not utilize a time-shift (or lag) volume or associated correlation (confidence) volume output, which would contain dynamic shifts along each trace and allow, in effect, a volume of alignment corrections to be applied to all horizons and faults. The abstract of D. L. Brumbaugh, "SMAP (Seismic Mistie Adjustment Procedure) Revisited and Revised", 61st Annual SEG Int. Mtg., Houston, Nov. 10–14, 1991, Expanded Tech Program Abstr. Biogr. V1, pp. 332–334, applies a static shift to seismic lines to match other interpretations and well data. The SMAP revision allows for any orientation of seismic line to be optimally corrected, but does not accommodate dynamic shifts along a trace.

W. L. Walters' U.S. Pat. No. 5,132,938, titled "Adjusting Seismic Data to Tie Other Data", issued Jul. 21, 1992, generates sets of data that are arranged according to the x-y-z coordinates of seismic lines or as isolated x-y-z points, such as well data. Different sets of data can be compared for the time gate about a common subsurface feature. Then a time delay is determined for each of the trace pairs from the different data sets. As will be understood to those skilled in the art, the terms time gate and time delay refer generally to interpretational differences which are more commonly referred to as mis-ties. These time delays are corrected to the reference surface using a least squares planar fit. The essential aspect of this method is that it requires a previously defined interpretation, whether seismic horizons or well data, to determine mis-ties. Thus, it requires a comparison of two sets of data to determine mis-ties. However, Walters' patent does not show how to correlate volumes, rather than horizons, for misalignment before the horizons are transferred. Volume correlation would only require a single horizon interpretation in a reference volume. Volume correlation used for the horizon alignment actually does not require any horizons, but in comparison to the Walters' patent, only one horizon, the original, is needed in order to transfer to another volume whereas Walters' method requires comparisons between two sets of data. Further, Walters' technique is a mis-tie technique within a single volume and not between different volumes.

The abstract of M. A. Herkomer and P. D. Whitney, "Minimizing Misties in Seismic Data", Battelle Memorial Inst. Computers Geosci., V 20, No. 5, pp. 767–795, 1995, describes a procedure that computes the mis-tied Z-value at each intersection to create a correction vector. The values of the correction vectors are smoothed and used to correct the mis-ties through a bulk shift (in other words a Z-axis correction). This technique, however, requires a comparison between two sets of interpreted surfaces and relies on the bulk shift for correction.

The abstract of F. Y. Michael, "Vintage Matching and Misties in Multisurvey Projects", 65th Annual SEG Int. Mtg, Houston, Oct. 8–13, 1995, Expanded Tech Program Abstr. Biogr., pp. 499–500, makes several references to advantages in vintage matching using advanced workstation technology. The abstract references mis-ties related to bulk shifts, but not to volume shifting, but does specifically, outline the benefits involved in vintage matching.

Industry trends in seismic processing are driven toward increased use and manipulation of three-dimensional seismic data volumes. Improved and more efficient processing algorithms have enabled the generation of copious derivative volumes from what had been considered the basic set of seismic volume data. A growing concern in industry is the management of interpretation data between varying seismic volume types, and none of the above-described techniques involve a true 3D volume-based tool. In addition, none involve volume-based analyses, and none allow the straightforward transfer of existing interpretations to different volumes. It is evident that there will be an increasing need within the seismic interpretation community for such a tool. The present invention is directed to this need.

SUMMARY OF THE INVENTION

The present invention is a method for transferring seismic horizons between three-dimensional seismic data volumes. First, a first seismic data volume is selected, preferably as a reference data volume. Then a second seismic data volume is selected, preferably covering the same area as the first seismic data volume and containing the seismic horizons to be adjusted. Then the first and second seismic data volumes are time-aligned. This generates a time-shift volume. A seismic horizon is selected, preferably from the second seismic data volume. Finally, the time-shift volume is applied to the seismic horizon. This generates a time-shifted seismic horizon, which can be output as an adjusted interpretation of the originally selected seismic horizon.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The present invention and its advantages may be more easily understood by reference to the following detailed description and the attached drawings in which.

Figure 1:
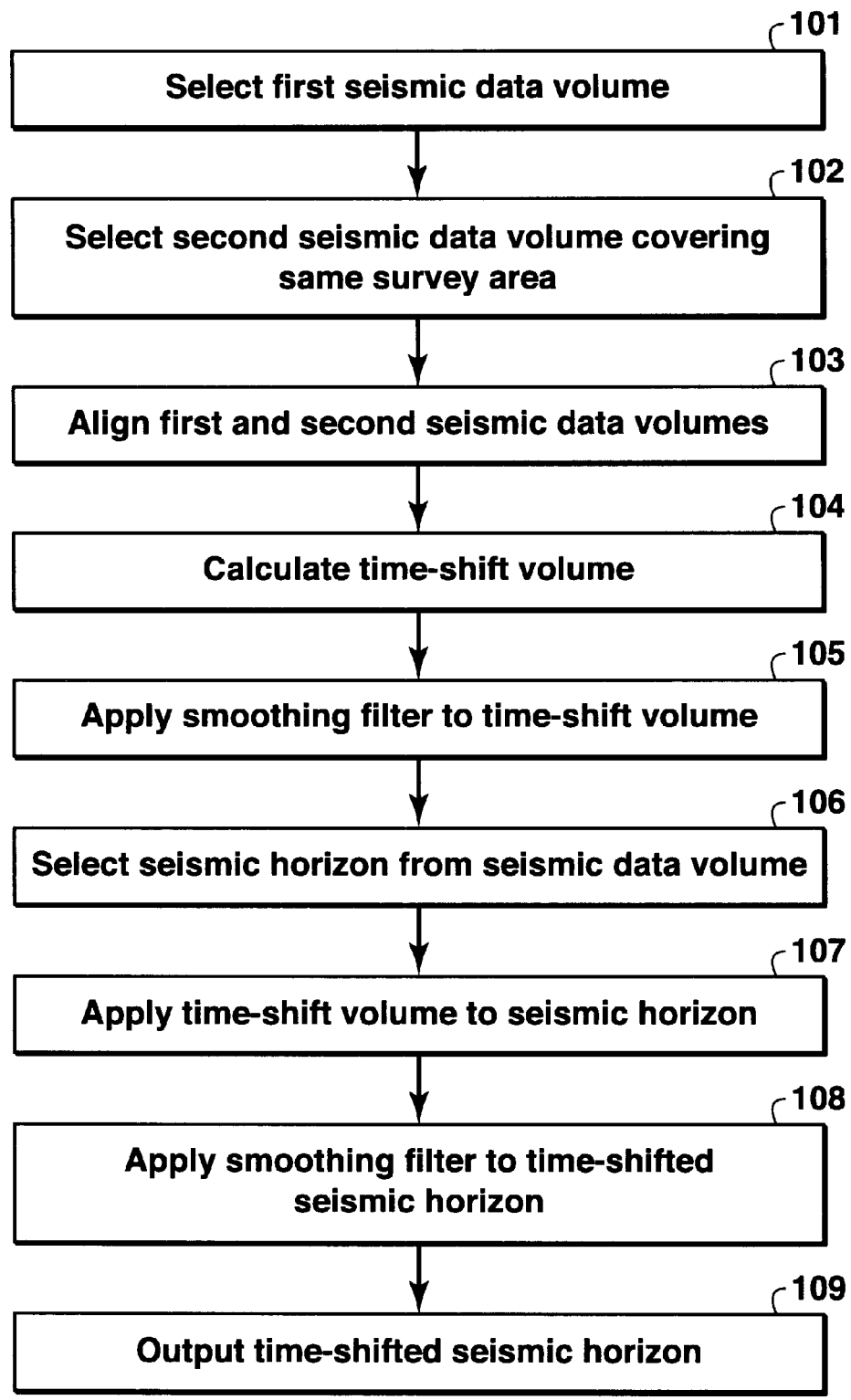
FIG. 1 is a flowchart illustrating the processing steps in an embodiment of the method of the invention.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The present invention is a method for aligning and transferring seismic horizons between a pair of three-dimensional seismic data volumes. In particular, the invention is a method for transferring horizon interpretations from a first volume to a second volume through volume alignment and lag volume generation. The second volume may derive from either different processing of the same data or from a different dataset for the same survey area. The method of the invention provides an accurate and efficient means to manage interpretation data between any such different volumes of seismic data in a true volume-based approach.

The volume-based nature of the present invention allows transfer of existing seismic interpretations to different, aligned volumes. Prior art methods generally require comparisons between interpreted horizons and are not volume-based. Volume-based horizon alignment is a significant advantage over traditional, trace-or-horizon-based correlation techniques that rely on various static shift calculation methods.

The volume-based approach allows for horizon alignment along each intersection that is not merely a static shift but rather is a dynamic shift along each trace. This dynamic shift allows different shift values to be applied to multiple interpreted horizons along a single trace rather than a bulk shift per horizon. In addition, the dynamic shift allows different time alignment values to be applied at each trace location instead of being limited to application of a best-fit or single static shift. The method of the invention improves the horizon to seismic alignment of these data by incorporating correlation and alignment of the seismic data before horizon alignment, and thus enables the interpreter to align multiple horizons with higher accuracy.

The method of the invention is capable of taking many interpreted horizons and aligning them for transfer to another volume through the use of the produced time-shift volumes. The method does not require re-interpretation on the new volume used for horizon transfer. Current commercial interpretation packages rely on horizon manipulation within the context of 2D or pseudo-3D seismic data loaded into workstation commercial systems and are not true volume-based tools.

The method of the invention therefore represents a significant step in applying seismic volume calculations to adjust interpretations. Efficiency, cost, and performance improvement in interpretation is also achieved through time savings from a more efficient tool to manage horizon alignment and transfer with numerous different derivative volume types necessary for the complete interpretation of the data from a survey area of interest to the analyst.

The method of the invention preferably uses two seismic volumes or seismic lines as input and generates a lag volume and associated correlation volume as intermediate output. The lag volume is then applied to the chosen horizons or faults to generate aligned horizons or faults as final output. The purpose of the method is to provide a rapid, accurate, and efficient means to assist in the transfer of horizon interpretations from one seismic 3D volume to another, between 2D and 3D surveys, or between lines of different 2D surveys. The discussion which follows focuses on the three-dimensional volume application of the present method, but that focus is not intended to be limiting.

FIG. 1 is a flow chart illustrating the processing steps of an embodiment of the method of the present invention. First, in steps 101 and 102, two three-dimensional volumes of seismic data are selected. In step 101, a first seismic data volume is selected. This first seismic data volume is preferably selected as a reference data volume. In step 102, a second seismic data volume is selected. This second seismic data volume is preferably selected as a volume whose seismic horizons will be shifted through correlation with the reference data volume from step 101. The second seismic data volume is selected to cover the same area, such as a survey area, as the first seismic data volume selected in step 101. To simplify volume display comparisons, the first and second seismic data volumes are preferably selected to have similar phase and polarity. These input seismic data volumes will be used to calculate a time-shift volume and a corresponding correlation volume for horizon alignment, producing a shifted horizon using values from the lag volume. Although horizon alignment between pairs of three-dimensional volumes of data are discussed in the following, the method works equally well for pairs of two-dimensional data sets.

In step 103, the traces in the first and second seismic data volumes from steps 101 and 102, respectively, are time-aligned. Any of a number of methods known in the art of seismic processing can be used for time-aligning the seismic data volumes. However, the preferred method is described in a concurrently filed, co-pending U.S. patent application No. 60/316,396 of Eastwood et. al. entitled, "Method for Time-Aligning Multiple Offset Seismic Data Volumes". This method is preferred for its accuracy, speed, and versatility, and is briefly outlined in the next two paragraphs.

Two seismic data volumes are time-aligned by first selecting a plurality of time shifts. The seismic data volumes are cross-correlated at the plurality of time shifts. An initial time-shift volume and a maximum correlation volume are created from the maximal cross-correlations at the plurality of time shifts. Areas of high time shift from the initial time-shift volume and areas of low cross-correlation from the maximum correlation volume are determined. The determined areas of high time shift and low cross-correlation are filtered from the initial time-shift volume, generating a filtered time-shift volume. The filtered time-shift volume is applied to one of the seismic volumes to generate a time-aligned volume.

This preferred method of time-alignment is volume based and is guided by calculated trace correlations that the user can accept or reject. All calculations are performed with sub-sample interpolation. This preferred method of time-alignment could also be applied in an iterative scheme. The time-shift volume and maximum correlation volume can be used to determine if the time alignment is sufficiently accurate or should be repeated.

Returning to FIG. 1, in step 104, a time-shift volume (or lag volume) is generated from the process of time-aligning the seismic data volumes in step 103. Note that the preferred method for time-aligning the first and second seismic data volumes, discussed in step 103, allows generation of a time-shift volume after the alignment has been finalized, and for that reason is the preferred method for obtaining the time-shift volume.

In step 105, in an alternative embodiment, a smoothing filter is optionally applied to the time-shift volume generated in step 104. Thus, the raw time-shift volume can be filtered to produce a smoothly varying time-shift in the time-shift volume.

In step 106, a seismic horizon is selected for shifting. The seismic horizon is preferably selected from the second seismic data volume selected in step 102. However, the seismic horizon could also be selected from the first seismic data volume selected in step 101 or from any other appropriate source of interpreted seismic data which is compatible with the two seismic data volumes used to produce the time-shift volume in step 104.

In step 107, the time-shift volume generated in step 104 (or the optionally smoothed time-shift volume from step 105) is applied to the seismic horizon selected in step 106. This generates a time-shifted seismic horizon, adjusted to the interpretation of the reference seismic data volume selected in step 101. Preferably, the seismic horizon is cross-referenced to the time-shift volume to produce a time-shifted horizon interpretation.

The process of applying the time-shift volume to the selected seismic horizon is straightforward. First, a horizon is selected in the first seismic data volume. Selecting the horizon means to specify the family of x,y,z grid points in the seismic data volume on which the horizon is found. Next, the time shift values for that family of x,y,z grid points are determined from the time shift volume specified in step 104. Finally, those time shift values are added to the times for the data values which correspond to those x,y,z grid points in the second seismic data volume. This three step process, embodied in step 107 of FIG. 1, results in a horizon which has been time-shifted in the second seismic data volume and which thereby corresponds to the location of that horizon in the first data volume.

The process of steps 106 and 107 of FIG. 1 can be applied to any, or all, of the horizons of interest in the seismic data volumes. In addition, for data volumes in which only a limited number of horizons, perhaps only one horizon, are of interest, the alignment process of step 103 can focus on that horizon, to ensure a high level of accuracy of the alignment in the region of the horizon, and then the process of step 107 can be applied solely to the grid points corresponding that horizon.

In step 108, in an alternative embodiment, a smoothing filter is optionally applied to the time-shifted seismic horizon from step 107. Thus, the time-shifted horizon may be filtered to produce a smoothly varying surface.

In step 109, the time-shifted horizon selected in step 107 (or the optionally smoothed, time-shifted horizon from step 108) is output. The time-shifted horizon may be output as a file containing the new horizon interpretation adjusted by the time-shift volume.

Figure 2A:
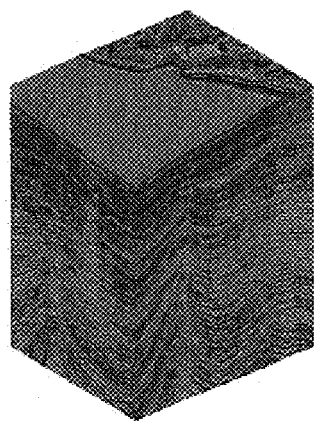
FIGS. 2A–2E show a sequence of volume calculations used in the method of the invention to align a seismic horizon from a first to a second seismic data volume.
Figure 2B:
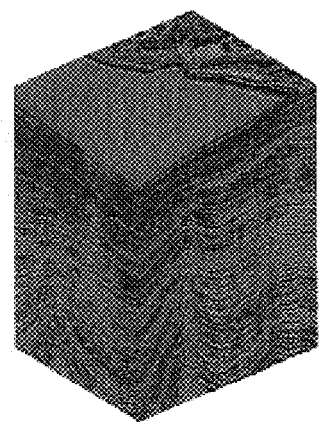
Figure 2D:
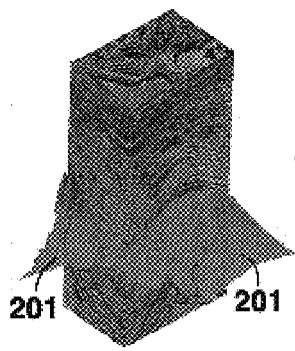
Figure 2C:
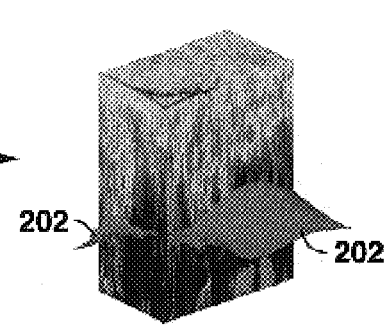
Figure 2E:
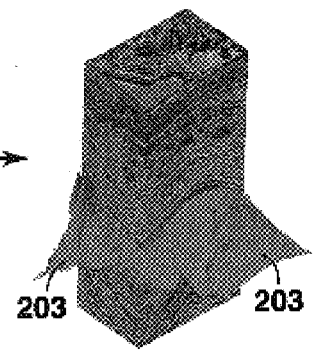

FIGS. 2A–2E show a representative sequence of volume calculations for alignment of a seismic horizon interpretation from a first to a second seismic data volume, using an embodiment of the method of the invention. FIG. 2A shows a first seismic data volume with an original seismic interpretation. A second data volume, corresponding to the same subsurface volume within the earth, but deriving, for example, from a different seismic dataset, is depicted in FIG. 2B. These two data volumes are aligned, according to step 103 of FIG. 1, to produce the time-shift volume shown in FIG. 2C. The data in this time-shift volume are time shifts between the two data volumes at each x,y,z grid point within the volumes. For the purpose of demonstrating the remaining steps of the present method, FIG. 2C is depicted in cutaway form. FIG. 2D depicts, in cut-away form, a representative horizon 201 from the first data volume depicted in FIG. 2A. The time shift surface 202 corresponding to the x,y,z grid points for this horizon are depicted in FIG. 2C. The time shifts on surface 202 are applied to the x,y,z points corresponding to this horizon in the second data volume, shown in cut-away form in FIG. 2E, to obtain a time-shifted horizon 203 in the second data volume.

Figure 3A:
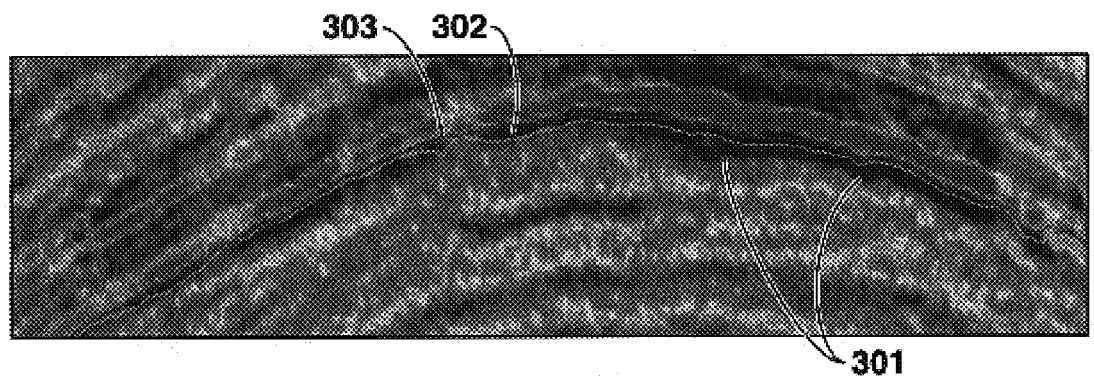
FIGS. 3A–3C show three seismic examples of horizon alignment for Class 3 amplitude anomalies, using an embodiment of the method of the invention.
Figure 3B:
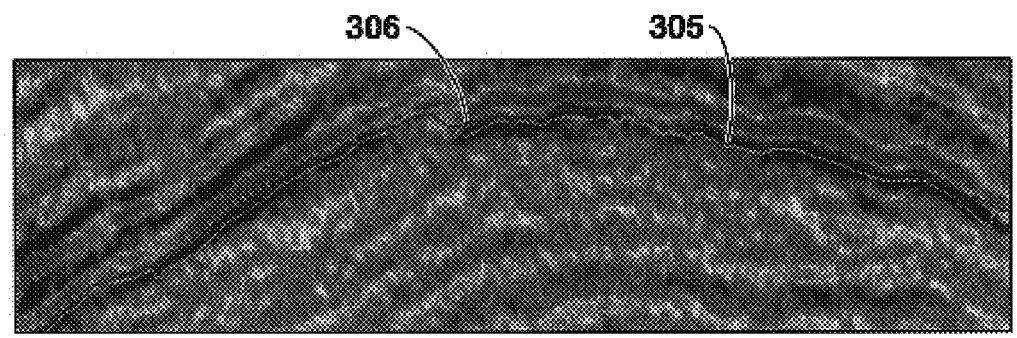
Figure 3C:
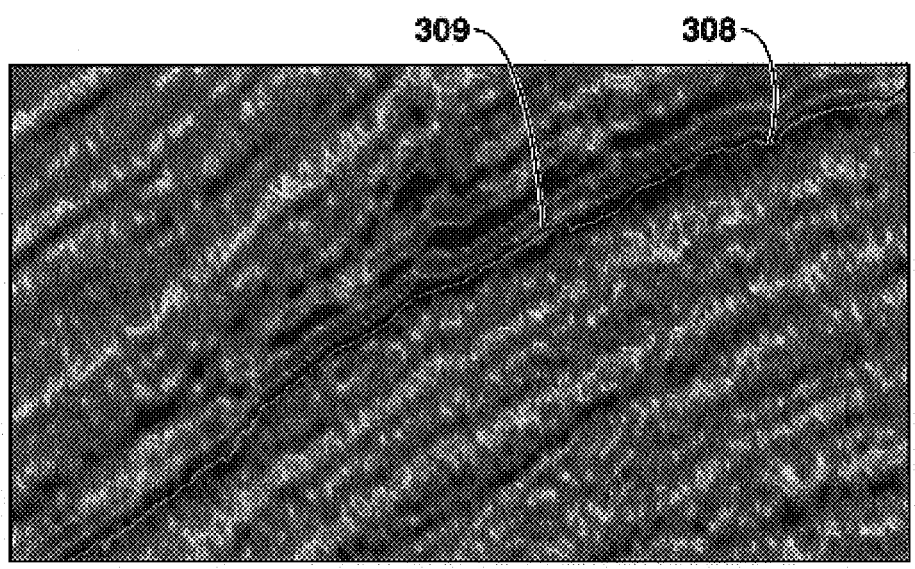

FIGS. 3A–3C show three seismic examples of horizon alignment using an embodiment of the method of the invention. These examples highlight alignment to a Class 3 AVO amplitude anomaly. In these examples, both the time-shifted horizon and the original horizon are superimposed on the figure for demonstrative purposes. The original horizon in these examples refers to the location at which the horizon from a first seismic dataset, not shown, would be transferred to the second seismic dataset, as shown in the examples, without application of the method of the present invention. In FIG. 3A, for example, a generally strong seismic signal 301 is indicated as the darker area behind original horizon 302. Note that original horizon 302 does not generally correspond to the upper boundary of seismic signal 301, as one skilled in the art would expect. However, after application of the present method, the time-shifted horizon 303 generally corresponds to the upper boundary of seismic signal 301. This correspondence indicates that the method of the present invention has aligned the horizon with the underlying seismic data. Similarly positive results are indicated in FIG. 3B, in which original horizon 305 and time-shifted horizon 306 are depicted, and FIG. 3C, in which original horizon 308 and time-shifted horizon 309 are depicted. These three examples indicate that the present method successfully shifts horizons independent of the type of geologic structure that may be present in the dataset.

Figure 4A:
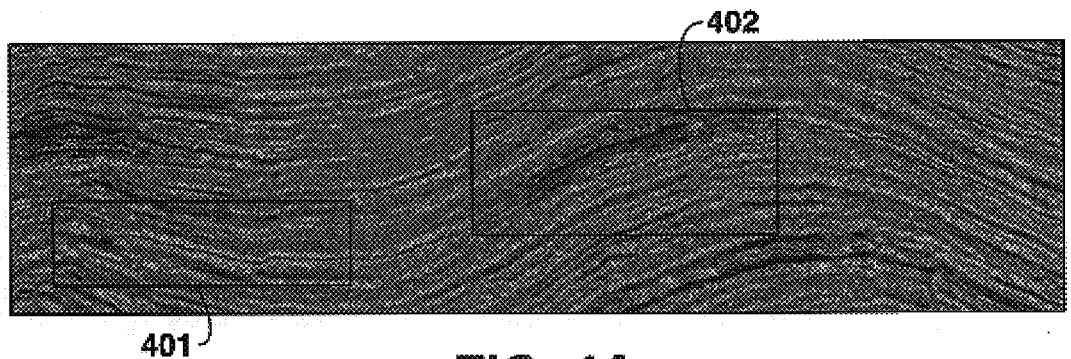
FIGS. 4A–4C show three views of an example of the alignment of a transferred horizon, using an embodiment of the method of the invention.
Figure 4B:
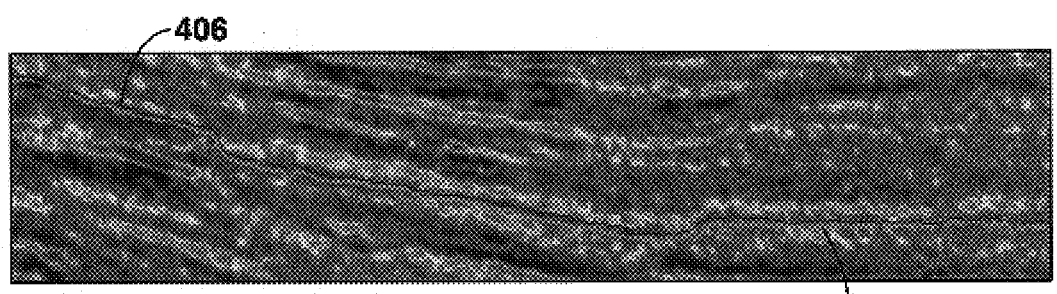
Figure 4C:
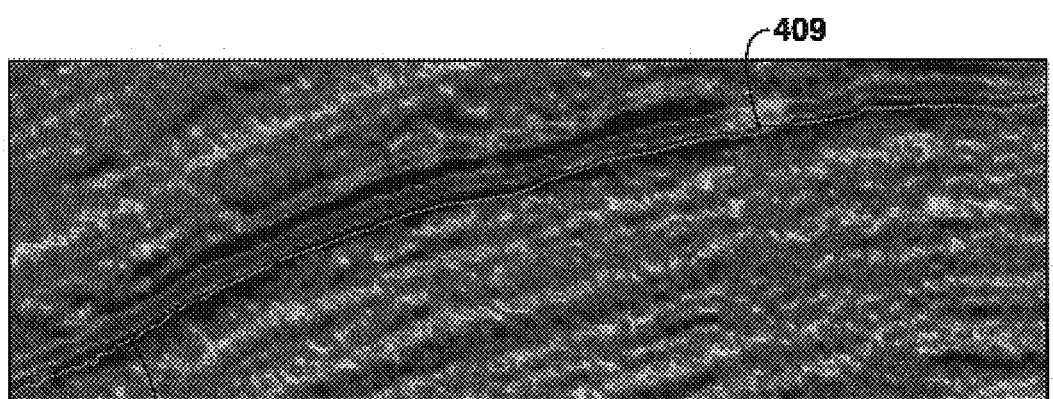

FIGS. 4A–4C show another example of the results of application of the present method where the data are good quality with a Type 3 amplitude anomaly class near the horizon. FIG. 4A shows the structure with two areas, 401 and 402 respectively, that are viewed in greater detail in FIGS. 4B and 4C. FIG. 4B shows accurate alignment of a portion of the aligned horizon 406, as compared with the original horizon 405, in area 401, which is characterized by a generally weak seismic signal. Area 402, which has a stronger seismic signal, is depicted in FIG. 4C, which shows accurate alignment of the horizon 409 to the data in an area of steep dip. Area 402 is notable in that even in areas of strong amplitude and well-imaged reflectors, the reprocessed seismic nevertheless has time misalignment with the original horizon 408. This difference is often greater in areas of poorer data quality, steep dip, or for non-Class 3 type amplitude responses.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

What is claimed is:

1. A method for transferring seismic horizons between three-dimensional seismic data volumes, comprising the steps of:

selecting a first seismic data volume;

selecting a second seismic data volume;

time-aligning the first and second seismic data volumes;

generating a time-shift volume from the time-alignment of the first and second seismic data volumes;

selecting a seismic horizon, and applying the time-shift volume to the seismic horizon, generating a time-shifted seismic horizon.

2. The method of claim 1, wherein the first and second seismic data volumes are selected to cover a same seismic survey area.

3. The method of claim 1, wherein the first and second seismic data volumes are selected to have similar phase and polarity.

4. The method of claim 1, comprising the further step of:

applying a smoothing filter to the time-shift volume.

5. The method of claim 1, comprising the further step of applying a smoothing filter to the time-shifted seismic horizon.

6. The method of claim 1, wherein the step of time-aligning the first and second seismic data volumes is performed iteratively.

* * * * *